(12) United States Patent
Hofmann et al.

(10) Patent No.: US 9,099,896 B2
(45) Date of Patent: Aug. 4, 2015

(54) STATOR FOR AN ELECTRIC MOTOR

(75) Inventors: Walter Hofmann, Mulfingen-Ailringen (DE); Rolf Bickel, Igersheim (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 397 days.

(21) Appl. No.: 13/569,215

(22) Filed: Aug. 8, 2012

(65) Prior Publication Data
US 2013/0038146 A1 Feb. 14, 2013

(30) Foreign Application Priority Data

Aug. 10, 2011 (EP) .................................. 11177137

(51) Int. Cl.
*H02K 5/08* (2006.01)
*H02K 5/10* (2006.01)
*H02K 5/22* (2006.01)
*H02K 3/52* (2006.01)

(52) U.S. Cl.
CPC .................. *H02K 5/08* (2013.01); *H02K 3/522* (2013.01); *H02K 5/10* (2013.01); *H02K 2203/09* (2013.01)

(58) Field of Classification Search
USPC ............................................... 310/43, 71, 88
See application file for complete search history.

(56) References Cited

U.S. PATENT DOCUMENTS

| 7,211,914 B2* | 5/2007 | Hofmann et al. ................ 310/88 |
| 7,402,925 B2* | 7/2008 | Best et al. ................... 310/68 C |
| 2010/0187920 A1* | 7/2010 | Best et al. ........................ 310/43 |

FOREIGN PATENT DOCUMENTS

| EP | 1 727 261 A1 | 11/2006 |
| EP | 2 214 293 A1 | 8/2010 |

OTHER PUBLICATIONS

European Search Report—Feb. 13, 2012.

* cited by examiner

*Primary Examiner* — Burton Mullins
(74) *Attorney, Agent, or Firm* — Brinks Gilson & Lione

(57) ABSTRACT

A stator for an electric motor, in particular for an external rotor motor, has a basic body (3) with a laminated stator core and with stator coils arranged on the laminated stator core. Each of the stator coils has a winding wire start and a winding wire end. Each winding wire start is attached to contact pins. The basic body (3) is extrusion-coated with a sleeve made from plastic, from which contact pins at least partially protrude. In order to reduce the manufacturing costs, a contact holder (2) encased in the sleeve together with the basic body (3) is pushed via the free ends of the contact pins onto the basic body (3), wherein the contact holder (2) encases the contact pins with a sealing section (11) in a gap-free, sealing manner.

9 Claims, 4 Drawing Sheets

STATOR FOR AN ELECTRIC MOTOR

CROSS REFERENCE TO RELATED APPLICATION

This invention claims priority to European Patent Application No. 11177137.4, filed Aug. 10, 2011.

BACKGROUND OF THE INVENTION

The invention relates to a stator for an electric motor, in particular for an external rotor motor, comprising a basic body with a laminated stator core as well as stator coils arranged on the laminated stator core, each having a winding wire start and a winding wire end, wherein each winding wire start is connected to contact pins, while the basic body is extrusion coated with a sleeve made from plastic, from which the contact pins at least partially protrude.

The so-called spray-molding technique is frequently used in order to protect the coil of electric motors against environmental influences. A completely wound stator coil is encased herein with a duroplastic or thermoplastic molding compound by means of a spraying process. As a result of the mechanical properties, this molding compound can also assume other functions. In order to make possible at the same time a simple and cost-effective assembly, for example, by means of a modular design, the electrical connections must be lead to the outside. This is frequently carried out by means of contact plugs.

In designs that correspond to the state of the art, the winding wires are positioned at the same time primarily manually in contact elements, which were previously secured on the stator by means of a pressing process. An auxiliary element must furthermore be positioned on the stator in order to ensure the necessary guide and protection of the winding wires for the spray-molding process, and the auxiliary element fulfills this function. The actual contact of the winding wires takes place then by means of hot pressing.

The tool that forms the hollow space for spray-molding during the spray-molding technique must incorporate recesses for these contact plugs, which are greater than the contact elements. In the known technical solutions used in the practice, material penetrates disadvantageously into the hollow spaces formed by the recesses and the contact pins during spray-molding. It must therefore frequently be manually removed in a separate downstream procedure.

SUMMARY OF THE INVENTION

It is the object of the invention to create a stator of the kind described in the beginning, with which the expense can be reduced during manufacture can be reduced by eliminating the mentioned disadvantages in a constructive way.

This object is attained according to the invention in that a contact holder surrounded by a casing together with the basic body is pushed on the basic body via the free end of the contact pins, wherein the contact holder encases the contact pins with a sealing section in a gap-free, sealing manner.

By using the contact holder provided as a stator component part according to the invention, it is advantageously possible to eliminate the work step "remove excess material," since the contact holder seals the outwardly projecting contact pins against the spray-molding tool during the spray-molding process. In other words, the contact holder makes it possible, especially if it is made from an elastic material, for the tool to come in direct contact via it with the stator components to be encased, so that all hollow spaces for the contact elements can be securely sealed without the subsequent need for the cleaning processes that are commonly practiced with the known stators.

The contact holder also acts at the same time in a positioning manner on the component parts on the stator and, when it is made from a suitable dielectric material, can also electrically insulate the winding wires as well as the current-carrying elements with respect to the coil and toward the outside. The contact holder can serve furthermore serve as constructive aid to connect to each other the winding wire ends of the stator windings at a common hub, in that a connecting bridge can be held in the contact holder. Other advantages of the invention consist in that the robustness of the stator is increased by the presence of the contact holder and its manufacture can be carried out more easily in an automated manner.

Other advantageous embodiments of the invention become apparent from the following description. The invention will be explained more closely on the basis of an embodiment represented in the enclosed drawings.

DETAILED DESCRIPTION OF THE DRAWINGS

Figure 1:
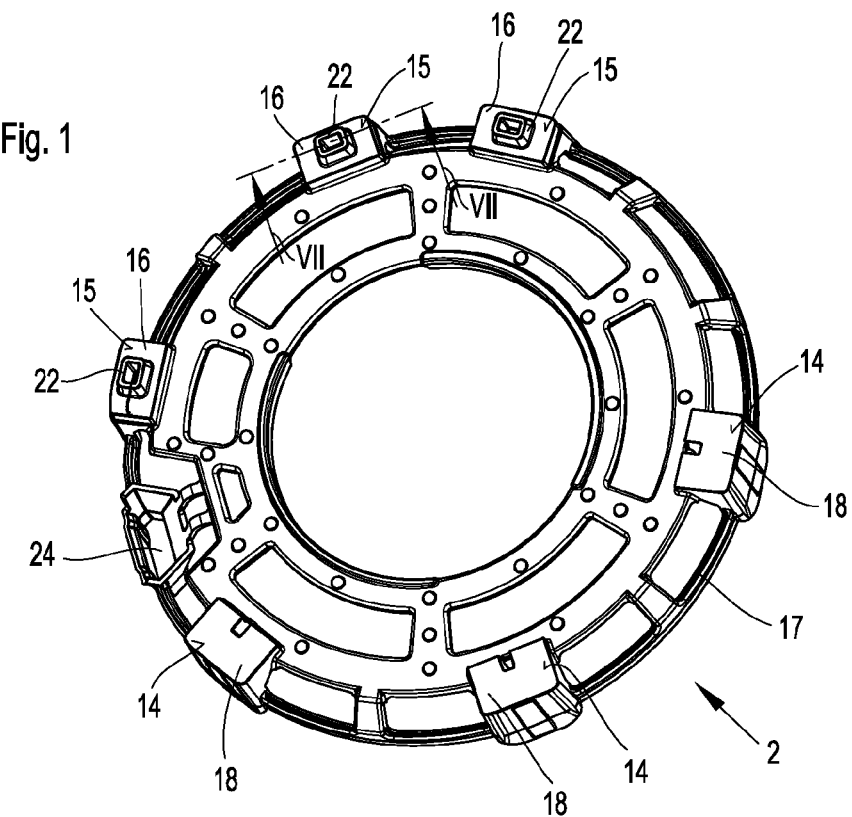
FIG. 1 shows a perspective view of a contact holder of a stator according to the invention.

It should be expressly emphasized regarding the following description that the invention is not limited to the illustrative embodiments and at the same time also not to all or several of the features of the described feature combinations, but that rather each single partial feature of the/each illustrative embodiment can also have inventive importance separately from all other partial features described in connection thereto and also in combination with any desired features of another illustrative embodiment.

Identical parts are always provided with the same reference characters in the figures of the drawing, so that as a rule they only have to be described once.

Figure 2:
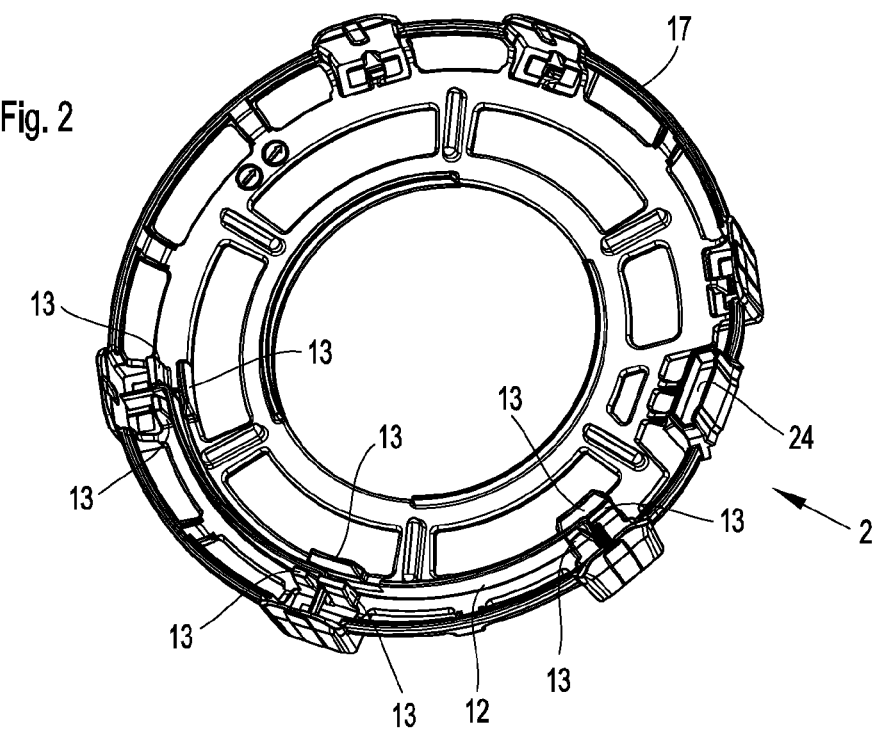
FIG. 2 shows a perspective bottom view of the contact holder represented in FIG. 1.
Figure 3:
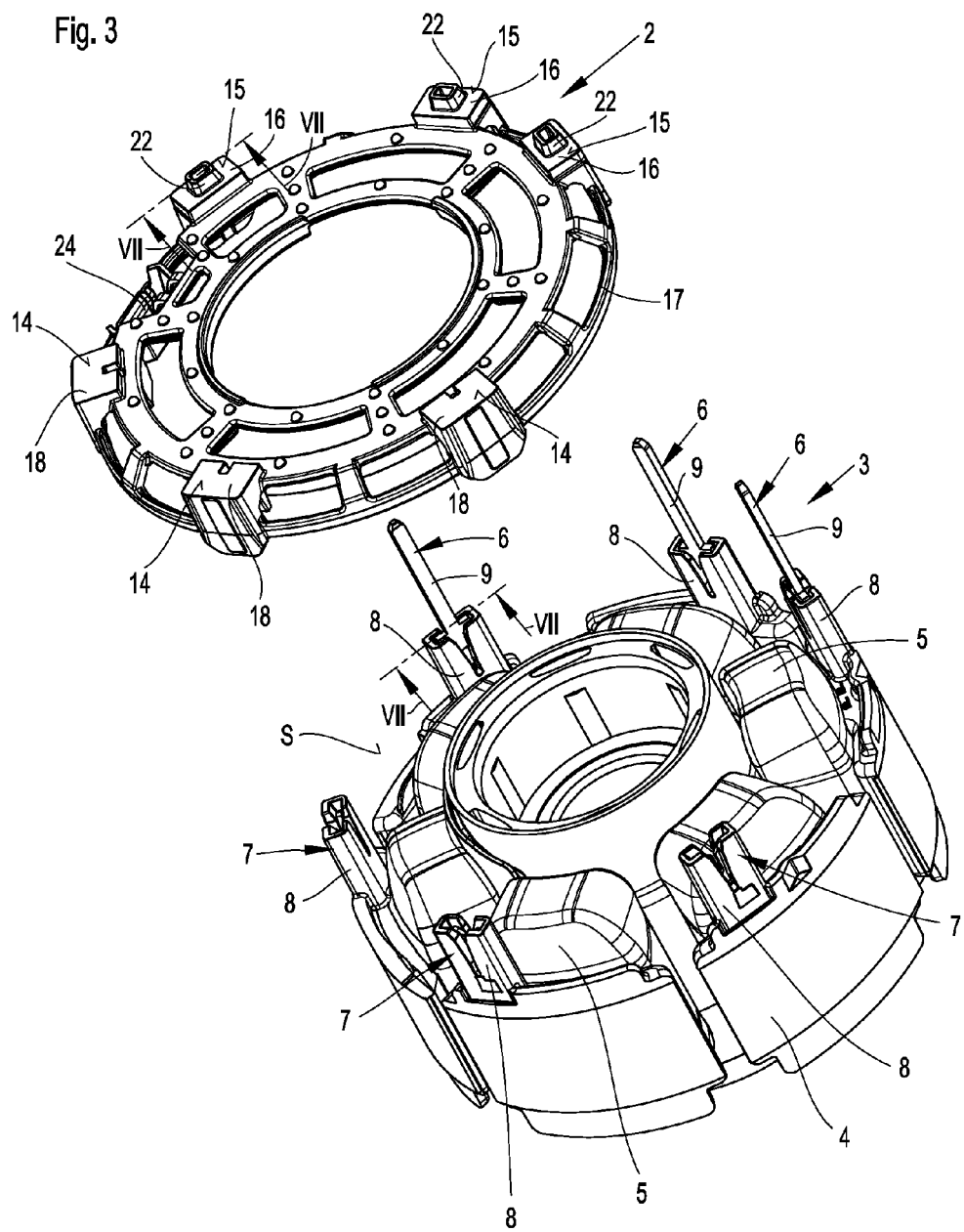
FIG. 3 shows an exploded perspective view of the contact holder shown in FIG. 1 and a basic body of a stator according to the invention.
Figure 4:
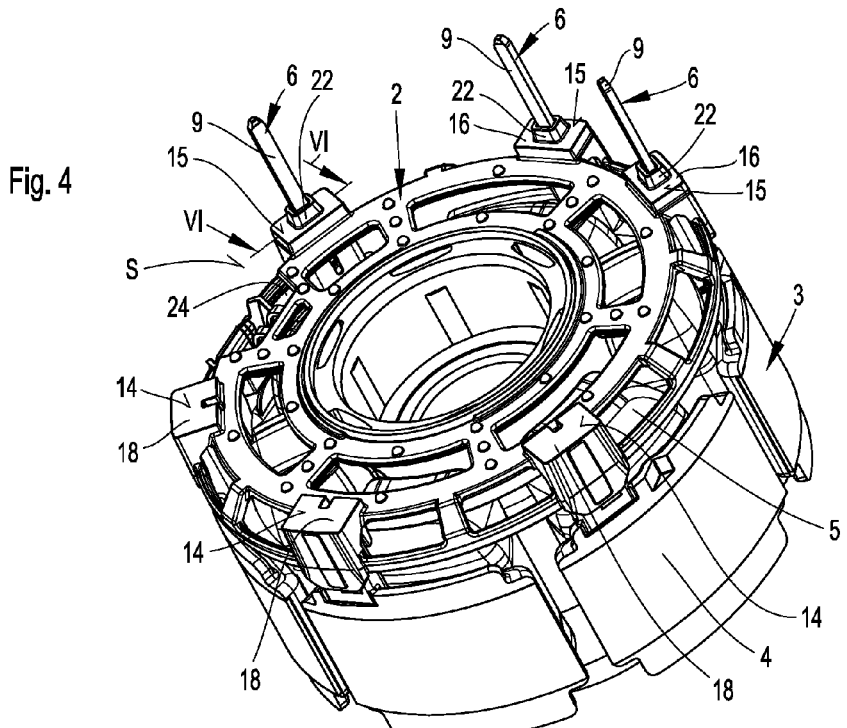
FIG. 4 shows a perspective view of the two components shown in FIG. 3 of the assembled stator according to the invention.
Figure 5:
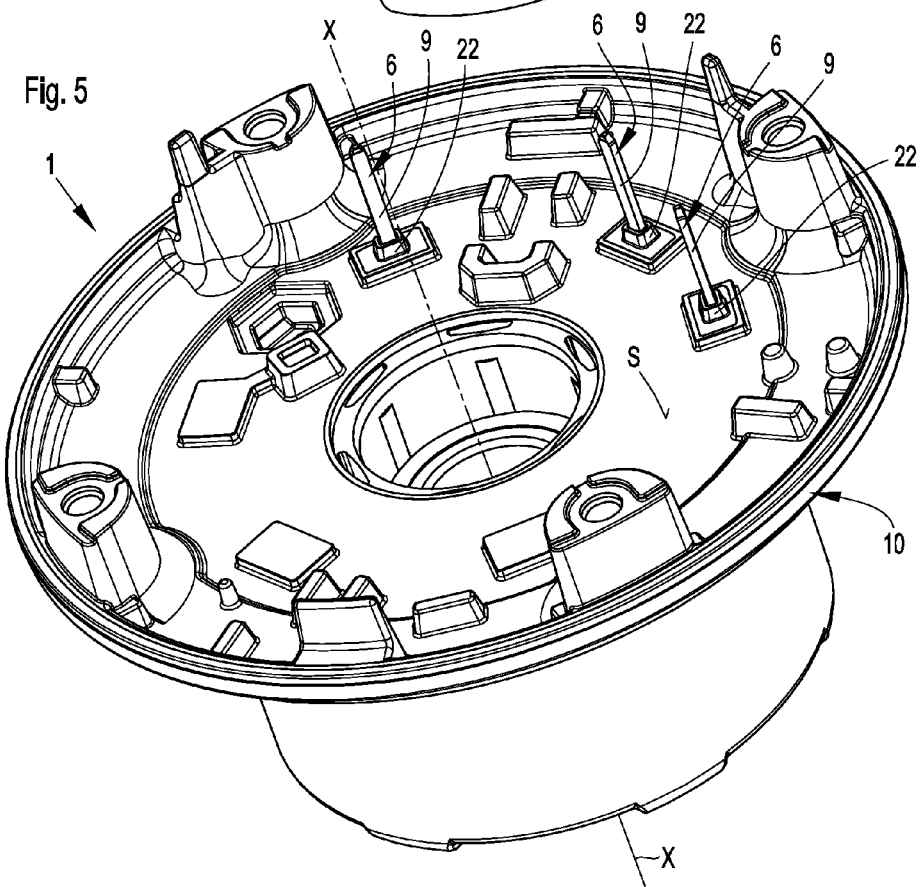
FIG. 5 shows a perspective view of a completed stator according to the invention.
Figure 6:
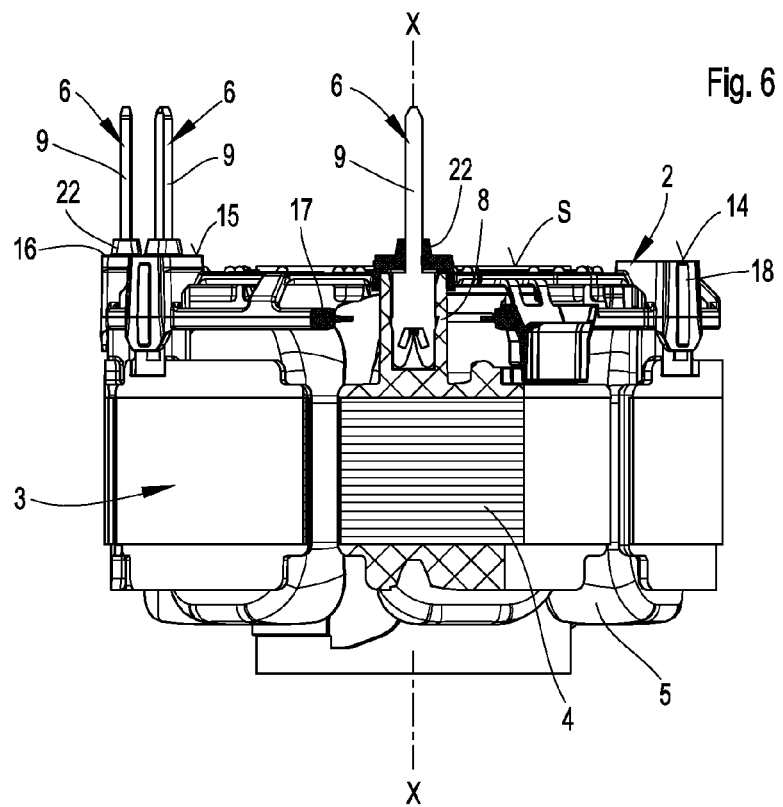
FIG. 6 shows a sectional view along line VI-VI of FIG. 4 of the two components of an assembled stator according to the invention represented in FIG. 3.

As can be seen in the depictions in FIGS. 1 to 4, it is inventively essential for a stator 1 according to the invention, which is shown in the completed form in FIG. 5, that it comprises a contact holder 2 according to the invention, which is shown in FIGS. 1 to 3 as an individual part and in FIGS. 4 and 6 in an assembled condition with a basic body 3 of the stator 1 according to the invention.

The basic body 3 itself is shown in an exploded view in FIG. 3 as individual part and in the depictions of FIGS. 4 and 6 in an assembly with the contact holder 2.

The basic body 3 comprises—as can be clearly seen in the sectional view in FIG. 6—a laminated stator core 4 as well as stator windings 5 arranged therein, exhibit a winding wire start and a winding wire end. The actual winding wire starts and ends cannot be seen in the graphic representation, since they lie hidden but the contact elements 6 are recognizable in FIGS. 3 to 6, to which the winding wire starts are respectively connected, and the contact elements 7, to which the winding wire ends are connected, can likewise be seen in FIG. 3. The mentioned contact elements 6, 7 are known insulation displacement contacts for the winding wire starts and for the winding wire ends. They are respectively located in dome-like first and second contact housing parts 8, which protrude from a front side S of the stator 1, the latter of which is generally perpendicular to the longitudinal axis X-X. Concerning the contact elements 6 for the winding wire starts, they are fixed in the respective first contact housing part 8.

In the assembled condition, the basic body 3 and the contact holder 2 fitted on the front face of the stator 1 are extrusion coated with a sleeve 10 consisting of plastic, from which the contact pins 9 partially protrude.

It is provided according to the invention that the contact holder 2 together with the basic body 3 encased in the casing 10 is pushed via the free end of the contact pins 9 onto the basic body 3, wherein it encases the contact pins 9 with a sealing section in a gap-free, sealing manner. This sealing section identified with the reference character 11 in the enlarged view according to FIG. 7. The contact holder 2 seals in particular the first contact housing part 8 for the contact pin 9 that protrudes from the front face of the basic body 3 of the stator 1 toward the outside.

A connecting bridge 12 can be provided, as can be seen in the depiction in FIG. 2, in order to connect the winding wire ends of the stator coils 5 to each other preferably at a mutual hub. The connecting bridge 12 can preferably be designed—as shown—as a metal strip, which comes in contact with the insulation displacement contacts and can be snapped to the underside of its holder in retaining elements 13 of the contact holder 2 having an elastic configuration.

Covering areas 14 of the contact holder 2 are provided opposite the holding elements 13 on the top of the contact holder 2, by means of which the second contact housing parts 8 protruding from the basic body 3 of the stator 1, which are likewise configured as the first contact housing parts 8 with the contact pins 9, are completely covered on the top.

Figure 7:
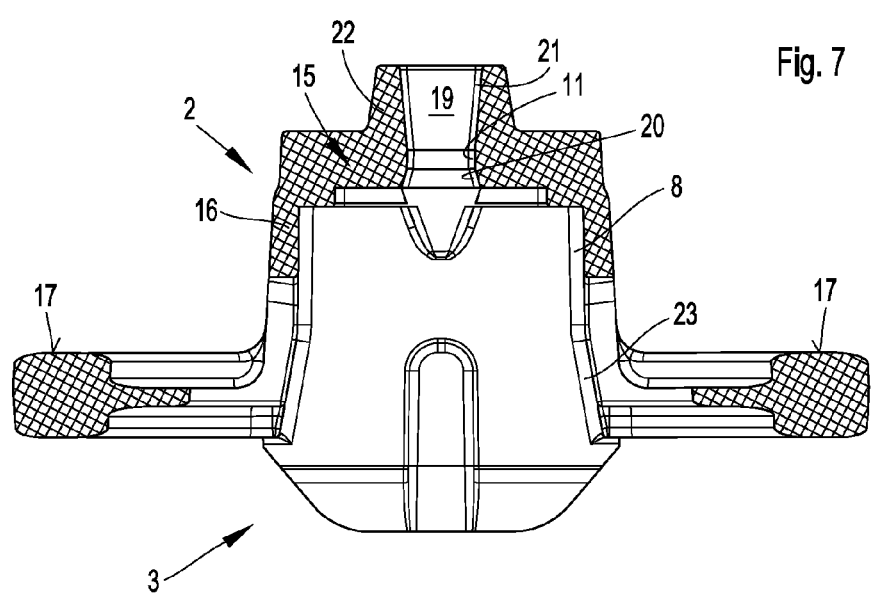
FIG. 7 shows a detailed and enlarged sectional view along line VII-VII of the contact holder of a stator according to the invention represented in FIGS. 1 and 3.

The covering areas 14 for the second contact housing parts 8 without contact pins 9 correspond—as shown in FIG. 1—to sealing areas 15 for the first contact housing parts 8 with contact pins 9. The sealing sections 11, which comprise the contact pins 9 according to the invention, are located in these sealing areas 15—as shown in particular in FIG. 7. FIG. 7 also shows that the sealing areas 15 can at the same time preferably configured as domes 16, which are arranged on a surrounding edge 17 of the contact holder 2, which constitutes a part of the contact holder 2. The same applies to the covering areas 14, where the corresponding domes are provided with reference character 18. No contact pin 9 is depicted in FIG. 7, but a channel 19, which penetrates the sealing area 15 and through which the contact pin 9 is guided in assembled condition. The channel has in particular a biconical internal characteristic, wherein a cone 20 facing toward the basic body 3 of the stator 1 serves as lead-in chamfer for the contact pin 9, when the contact holder 2 is guided via the free end of the contact pin 9 during assembly. A cone 21 that faces away from the basic body 3 of the stator 1 serves as lead-out chamfer for the tool, by means of which the sleeve 10 is produced. An additional encasing dome structure 22 can be provided—as shown—for the second cone 21, which can still project at the front face out of the sleeve 10 of the stator 1 after being encased with the plastic, in contrast with the covering areas 14 for the second contact housing parts 8 without contact pins 9. This is shown in FIG. 5.

The first contact housing part 8 arranged underneath the sealing area 15 can have—as also shown in FIG. 7—a lead-in chamfer 23 for an easier joining of the contact holder 2. After fitting the contact holder 2, the winding wire starts or ends, as well as also the feedthroughs of the contact pins 9, are sealed.

The contact holder 2 can preferably be designed as one-piece—as depicted—injection molded or press molded part with ring-shaped basic design or in the form of one or several circular ring segments. A closed ring imparts the contact holder 2 at the same with a greater stability than a circular ring segment and has a stronger adjusting effect on the contact pins 9, when pushed onto the basic body 3.

The person skilled in the art can supplement the invention by means of additional useful technical measures without abandoning the scope of the invention. For example, pockets for specific components, such as the pocket 24 for a Hall sensor depicted in FIGS. 1 to 4, can be provided in the contact holder 2.

The invention is furthermore not limited to the illustrative embodiments disclosed, but can also be defined by any other desired combination of specific features and their equivalents out of all disclosed individual features. Thus, practically any individual feature can be omitted or replaced by at least one of the individual features or their equivalents disclosed at another location in the application.

The invention claimed is:

1. A stator for an electric motor, the stator comprising:
   a basic body having a stator core;
   at least one contact pin arranged on the basic body, the at least one contact pin having a protruding free end;
   a plurality of stator coils arranged on the stator core, each of the stator coils having a winding wire start and a winding wire end, each winding wire start being attached to at least one contact pin and all winding wire ends being connected to each other;
   a molded plastic sleeve coating the basic body;
   a contact holder coated by the plastic sleeve together with the basic body;
   wherein the free end of each contact pin is threaded through the contact holder and protrudes from the molded plastic sleeve, and the contact holder surrounds each contact pin with a sealing section in a gap-free, sealing manner, wherein the contact holder comprises at least one sealing area in which at least one sealing section is located, the at least one sealing area sealing at least one first contact housing part that protrudes from the basic body of the stator, wherein the at least one contact pin is guided through the at least one first contact housing part and further comprises that each sealing area is penetrated by a channel through which the contact pin is guided and wherein the channel has a substantially biconical contour.

2. The stator of claim 1, wherein the winding wire ends are connected to each other at a common hub.

3. The stator of claim 2, further comprising that the winding wire ends of the stator coils are connected to each other at the common hub via a connecting bridge secured to the contact holder.

4. The stator of claim 3, further comprising the connecting bridge is secured to the contact holder with a snap connection.

5. The stator of claim 1, further comprising that the contact holder is a unitary injection-molded part with a ring-shaped geometry.

6. The stator of claim 1, further comprising that the at least one sealing area is configured as a dome arranged on a top surface of the contact holder, the top surface forming a part of a front face of the basic body of the stator.

7. The stator of claim 1, further comprising that the at least one first contact housing part, through which the at least one contact pin is guided, has a conical opening or lead-in chamfer for installation of the at least one contact pin.

8. The stator of claim 1, wherein the contact holder further comprises at least one cover area that completely covers at last one second contact housing part that protrudes from the basic body of the stator, wherein no contact pin is guided through the at least one second housing part.

9. The stator of claim 8, further comprising that the at least one cover area is configured as a dome arranged on a top surface of the contact holder, the top surface forming a part of a front face of the basic body of the stator.

* * * * *